United States Patent
Yang et al.

(10) Patent No.: US 10,448,373 B2
(45) Date of Patent: Oct. 15, 2019

(54) METHOD FOR TRANSMITTING SIGNAL FOR MTC AND APPARATUS FOR SAME

(71) Applicant: LG ELECTRONICS INC., Seoul (KR)

(72) Inventors: Suckchel Yang, Seoul (KR); Joonkui Ahn, Seoul (KR); Yunjung Yi, Seoul (KR); Hyangsun You, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/868,163

(22) Filed: Jan. 11, 2018

(65) Prior Publication Data

US 2018/0139743 A1    May 17, 2018

Related U.S. Application Data

(63) Continuation of application No. 14/903,018, filed as application No. PCT/KR2014/006890 on Jul. 28, 2014, now Pat. No. 9,907,055.
(Continued)

(51) Int. Cl.
*H04W 72/04* (2009.01)
*H04L 5/00* (2006.01)
(Continued)

(52) U.S. Cl.
CPC ......... *H04W 72/0406* (2013.01); *H04L 1/189* (2013.01); *H04L 1/1812* (2013.01);
(Continued)

(58) Field of Classification Search
None
See application file for complete search history.

(56) References Cited

U.S. PATENT DOCUMENTS

2013/0083753 A1   4/2013   Lee et al.
2013/0182632 A1   7/2013   Maeda et al.
(Continued)

FOREIGN PATENT DOCUMENTS

CN   101959138 A   1/2011
CN   102308490 A   1/2012
(Continued)

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 11)," 3GPP TS 36.321, V11.3.0, Jun. 2013, pp. 1-57.
(Continued)

*Primary Examiner* — Brian S Roberts
(74) *Attorney, Agent, or Firm* — Birch, Stewart, Kolasch & Birch, LLP

(57) ABSTRACT

A method for receiving system information by a user equipment (UE) in a wireless communication system supporting coverage enhancement, the method includes receiving, by the UE, a first system information block (SIB) from a base station, the first SIB including scheduling information indicating resource block information and transport block size information for a second SIB; and repeatedly receiving, by the UE, the second SIB from the base station based on the indicated resource block information and transport block size information.

18 Claims, 11 Drawing Sheets

Related U.S. Application Data

(60) Provisional application No. 61/936,885, filed on Feb. 7, 2014, provisional application No. 61/919,825, filed on Dec. 23, 2013, provisional application No. 61/910,970, filed on Dec. 3, 2013, provisional application No. 61/906,424, filed on Nov. 20, 2013, provisional application No. 61/903,413, filed on Nov. 13, 2013, provisional application No. 61/903,920, filed on Nov. 13, 2013, provisional application No. 61/902,138, filed on Nov. 8, 2013, provisional application No. 61/897,200, filed on Oct. 29, 2013, provisional application No. 61/894,904, filed on Oct. 23, 2013, provisional application No. 61/858,633, filed on Jul. 26, 2013.

(51) Int. Cl.
| | | |
|---|---|---|
| *H04L 1/18* | (2006.01) | |
| *H04W 72/14* | (2009.01) | |
| *H04W 74/08* | (2009.01) | |
| *H04W 4/70* | (2018.01) | |
| *H04W 4/021* | (2018.01) | |

(52) U.S. Cl.
CPC ........... *H04L 5/0053* (2013.01); *H04W 4/021* (2013.01); *H04W 4/70* (2018.02); *H04W 72/14* (2013.01); *H04W 74/0833* (2013.01); *H04L 5/0055* (2013.01); *H04L 5/0094* (2013.01)

(56) References Cited

U.S. PATENT DOCUMENTS

| | | |
|---|---|---|
| 2013/0223298 A1 | 8/2013 | Ahn et al. |
| 2013/0242882 A1 | 9/2013 | Blankenship et al. |
| 2014/0044056 A1 | 2/2014 | Chen et al. |
| 2014/0153453 A1 | 6/2014 | Park et al. |
| 2015/0016312 A1* | 1/2015 | Li ..................... H04W 74/0833 370/280 |
| 2015/0382284 A1* | 12/2015 | Brismar ................ H04W 74/04 370/329 |

FOREIGN PATENT DOCUMENTS

| | | |
|---|---|---|
| EP | 2424320 A1 | 2/2012 |
| WO | WO 2012/134107 A2 | 10/2012 |
| WO | WO 2013/012190 A2 | 1/2013 |
| WO | WO 2013/051856 A1 | 4/2013 |
| WO | WO 2013/058599 A1 | 4/2013 |

OTHER PUBLICATIONS

Alcatel-Lucent et al., "Feasibility of Coverage Extension of Physical Channels for MTC Devices," 3GPP TSG-RAN WG1 Meeting #72, R1-130462, St Julian's, Malta, Jan. 28-Feb. 1, 2013 (downloaded by EPO Jan. 19, 2013), 7 pages.

Renesas Mobile Europe LTE, "PDSCH/PUSCH coverage improvements for low-cost MTC," 3GPP TSG RAN WG1 Meeting #72bis, R1-131370, Chicago, USA, Apr. 15-19, 2013, 5 pages.

Samsung, "PDSCH/PUSCH coverage imporvement techniques for low-cost MTC UEs," 3GPP TSG RAN WG1 #72bis, R1-131016, Chicago, USA, Apr. 15-19, 2013, pp. 1-2.

* cited by examiner

FIG. 14

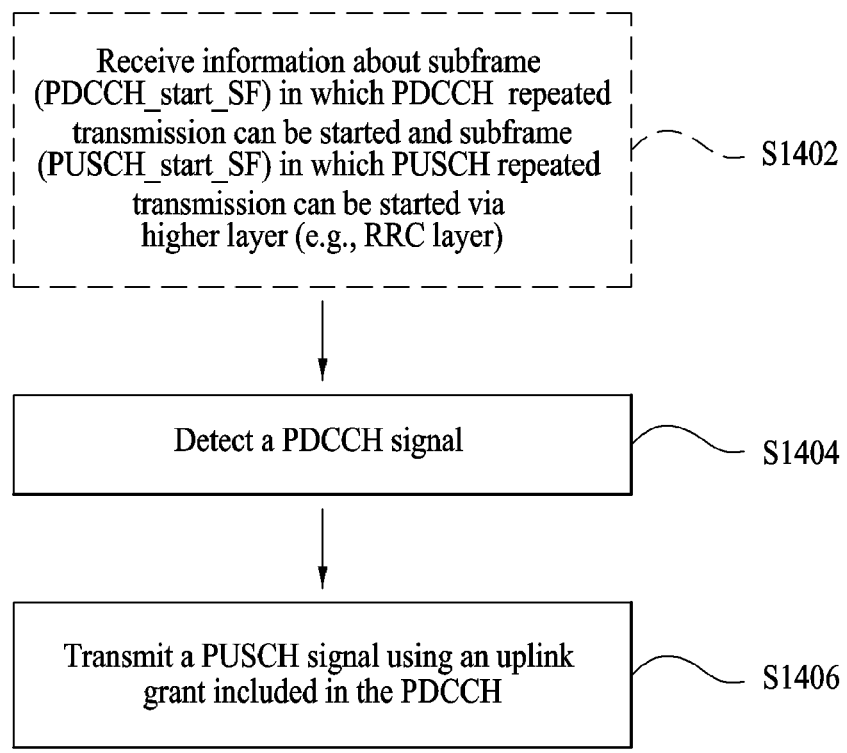

* When UE is a first type UE (or normal UE),
the PUSCH signal is transmitted in a subframe
obtained by adding a specific offset to a subframe
in which the PDCCH signal is detected.
* When UE is a second type UE (or LCT UE),
a PDCCH signal is repeatedly transmitted in a first
plurality of subframe intervals and the PUSCH signal
begins to be transmitted in PUSCH_start_SF closest to
a last (or initial) subframe of the first plurality of subframe intervals

METHOD FOR TRANSMITTING SIGNAL FOR MTC AND APPARATUS FOR SAME

CROSS-REFERENCE TO RELATED APPLICATIONS

This Application is a Continuation of U.S. patent application Ser. No. 14/903,018 filed on Jan. 5, 2016, which is the National Phase of PCT International Application No. PCT/KR2014/006890 filed on Jul. 28, 2014, which claims the benefit under 35 U.S.C. § 119(e) to U.S. Provisional Application Nos. 61/936,885 filed on Feb. 7, 2014, 61/919,825 filed on Dec. 23, 2013, 61/910,970 filed on Dec. 3, 2013, 61/906,424 filed on Nov. 20, 2013, 61/903,413 filed on Nov. 13, 2013, 61/903,920 filed on Nov. 13, 2013, 61/902,138 filed on Nov. 8, 2013, 61/897,200 filed on Oct. 29, 2013, 61/894,904 filed on Oct. 23, 2013 and 61/858,633 filed on Jul. 26, 2013, all of which are hereby expressly incorporated by reference into the present application.

BACKGROUND OF THE INVENTION

Field of the Invention

The present invention relates to a method and apparatus for transmitting a signal in a wireless communication system. More particularly, the present invention relates to a method and apparatus for transmitting and receiving a signal for machine type communication (MTC).

Discussion of the Related Art

Recently, wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) and the like. In a wireless communication system, a user equipment (UE) may receive information from a base station in downlink (DL), and the user equipment may transmit information to the base station in uplink (UL). The information transmitted or received by the UE may include data and various control information. In addition, there are various physical channels according to the type or use of the information transmitted or received by the UE.

SUMMARY OF THE INVENTION

An object of the present invention is to provide a method and apparatus for effectively transmitting and receiving a signal in a wireless communication system, more specifically, to provide a method and apparatus for effectively transmitting and receiving a signal for machine type communication (MTC).

Another object of the present invention is to provide a method and apparatus for effectively signal transmission and reception for coverage enhancement in a wireless communication system, more specifically, to provide a method and apparatus for effective signal configuration and transmission and reception timing when repeated transmission and reception of the same signal is performed for coverage enhancement in a wireless communication system.

It is to be understood that both the foregoing general description and the following detailed description of the present invention are exemplary and explanatory and are intended to provide further explanation of the invention as claimed.

In an aspect of the present invention, provided herein is a method for transmitting and receiving a signal by a user equipment (UE) in a wireless communication system supporting a repeated transmission of a same signal, the method comprising: detecting a physical downlink control channel (PDCCH) signal; and when the PDCCH signal contains uplink grant, transmitting a physical uplink shared channel (PUSCH) signal using the uplink grant, wherein: when the UE is a first type UE, the PUSCH signal is transmitted in a subframe obtained by applying a first offset to a subframe in which the PDCCH signal is detected; when the UE is a second type UE, the PDCCH signal is repeatedly transmitted in a first plurality of subframe intervals and the PUSCH signal begins to be transmitted in a subframe in which PUSCH repeated transmission can be started and which is closest to a last subframe of the first plurality of subframe intervals; and the subframe in which PUSCH repeated transmission can be started is preconfigured via higher layer signaling.

Preferably, the method further comprises receiving a physical hybrid automatic repeat request (HARQ) indicator channel (PHICH) signal for the PUSCH signal, wherein: when the UE is the first type UE, the PHICH signal is received in a subframe obtained by applying a second offset to a subframe in which the PUSCH signal is transmitted; when the UE is the second type UE, the PHICH signal begins to be received in a subframe in which PHICH repeated reception can be started and which is closest to a last subframe of a second plurality of subframe intervals in which the PUSCH signal is repeatedly transmitted; and the subframe in which PHICH repeated transmission can be started is preconfigured via higher layer signaling.

Preferably, the method further comprises, when the PDCCH signal contains downlink grant, receiving a physical downlink shared channel (PDSCH) signal scheduled by the downlink grant, wherein: when the UE is the first type UE, the PDSCH signal is received in a subframe in which the PDCCH signal is detected; when the UE is the second type UE, the PDCCH signal is repeatedly transmitted in the first plurality of subframe intervals, and the PDSCH signal begins to be received in a subframe in which PDSCH repeated reception can be started and which is closest to a last subframe of the first plurality of subframe intervals; and the subframe in which PDSCH repeated transmission can be started is preconfigured via higher layer signaling.

Preferably, the method further comprises transmitting a physical uplink control channel (PUCCH) signal containing a hybrid automatic repeat request acknowledgement (HARQ-ACK) signal for the PDSCH signal, wherein: when the UE is the first type UE, the PUCCH signal is transmitted in a subframe obtained by applying a third offset to a subframe in which the PDSCH signal is received; when the UE is the second type UE, the PUCCH signal begins to be transmitted in a subframe in which PUCCH repeated transmission can be started and which is closest to a last subframe of a third plurality of subframe intervals in which the PDSCH is repeatedly transmitted; and the subframe in which PUCCH repeated transmission can be started is preconfigured via higher layer signaling.

Preferably, the second type UE has lower complexity than the first type UE.

In another aspect of the present invention, provided herein is a user equipment (UE) for transmitting and receiving a single in a wireless communication system for supporting a repeated transmission of a same signal, the UE comprising: a radio frequency (RF) unit; and a processor connected to the RF unit during an operation of the processor, wherein: the processor is configured to detect a physical downlink control channel (PDCCH) signal and to, when the PDCCH signal contains uplink grant, transmit a physical uplink shared channel (PUSCH) signal using the uplink grant; when the UE is a first type UE, the PUSCH signal is transmitted in a subframe obtained by applying a first offset to a subframe, in which the PDCCH signal is detected; when the UE is a second type UE, the PDCCH signal is repeatedly transmitted in a first plurality of subframe intervals and the PUSCH signal begins to be transmitted in a subframe in which PUSCH repeated transmission can be started and which is closest to a last subframe of the first plurality of subframe intervals; and the subframe in which PUSCH repeated transmission can be started is preconfigured via higher layer signaling.

Preferably, the processor is further configured to receive a physical hybrid automatic repeat request (HARQ) indicator channel (PHICH) signal for the PUSCH signal; when the UE is the first type UE, the PHICH signal is received in a subframe obtained by applying a second offset to a subframe in which the PUSCH signal is transmitted; when the UE is the second type UE, the PHICH signal begins to be received in a subframe in which PHICH repeated reception can be started and which is closest to a last subframe of a second plurality of subframe intervals in which the PUSCH signal is repeatedly transmitted; and the subframe in which PHICH repeated transmission can be started is preconfigured via higher layer signaling.

Preferably, the processor is further configured to, when the PDCCH signal contains downlink grant, receive a physical downlink shared channel (PDSCH) signal scheduled by the downlink grant; when the UE is the first type UE, the PDSCH signal is received in a subframe in which the PDCCH signal is detected; when the UE is the second type UE, the PDCCH signal is repeatedly transmitted in the first plurality of subframe intervals, and the PDSCH signal begins to be received in a subframe in which PDSCH repeated reception can be started and which is closest to a last subframe of the first plurality of subframe intervals; and the subframe in which PDSCH repeated transmission can be started is preconfigured via higher layer signaling.

Preferably, the processor is further configured to transmit a physical uplink control channel (PUCCH) signal containing a hybrid automatic repeat request acknowledgement (HARQ-ACK) signal for the PDSCH signal; when the UE is the first type UE, the PUCCH signal is transmitted in a subframe obtained by applying a third offset to a subframe in which the PDSCH signal is received; when the UE is the second type UE, the PUCCH signal begins to be transmitted in a subframe in which PUCCH repeated transmission can be started and which is closest to a last subframe of a third plurality of subframe intervals in which the PDSCH is repeatedly transmitted; and the subframe in which PUCCH repeated transmission can be started is preconfigured via higher layer signaling.

Preferably, the second type UE has lower complexity than the first type UE.

According to the present invention, a signal may be effectively transmitted and received in a wireless communication system, and more specifically, a signal may be effectively transmitted and received in a wireless communication system for machine type communication (MTC).

According to the present invention, a signal may be effectively transmitted and received for coverage enhancement in a wireless communication system, and more specifically, a signal may be effectively configured and transmission and reception timing may be effectively determined when repeated transmission and reception of the same signal is performed for coverage enhancement in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 14 is a flowchart illustrating a method for receiving a PDCCH and receiving a PUSCH according to the present invention.

DETAILED DESCRIPTION OF THE EMBODIMENTS

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical principles of the present invention are not limited thereto. Further, a particular terminology is provided for better understanding of the present invention. However, such a particular terminology may be changed without departing from the technical principles of the present invention. For example, the present invention may be applied to a system in accordance with a 3GPP LTE/LTE-A system as well as a system in accordance with another 3GPP standard, IEEE 802.xx standard, 3GPP2 standard, or a next-generation communication standard.

In a wireless access system, a user equipment (UE) may receive information from a BS in downlink (DL) and transmit information in uplink (UL). The information transmitted or received by the UE may include data and various control information. In addition, there are various physical channels according to the type or use of the information transmitted or received by the UE.

Figure 1:
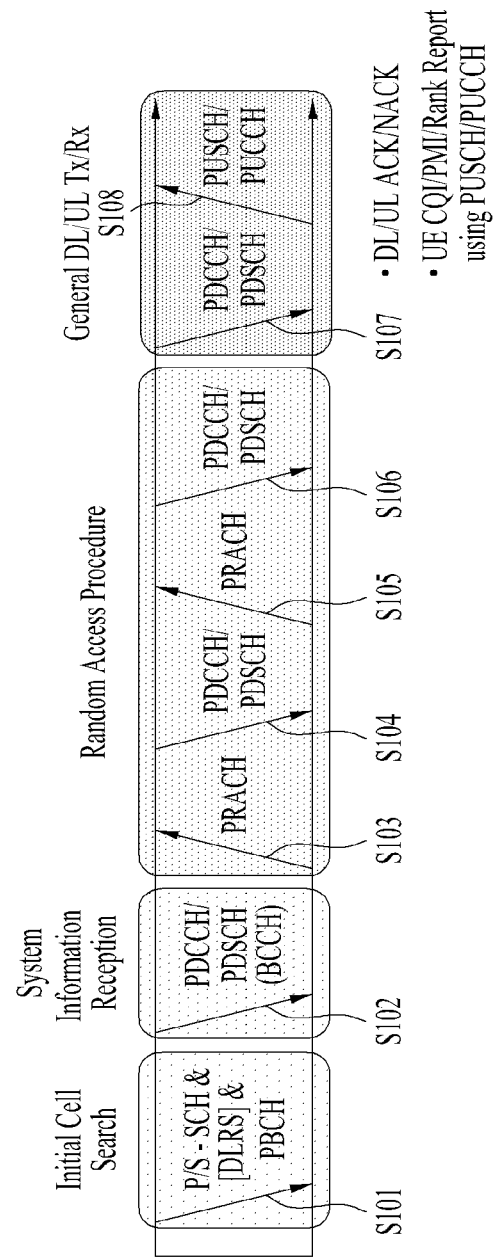
FIG. 1 illustrates physical channels and a general method for transmitting signals on the physical channels in the present invention.

FIG. 1 illustrates physical channels and a general method for transmitting signals on the physical channels in the present invention.

When a UE is powered on or enters a new cell, the UE performs initial cell search in step S101. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S102.

To complete access to the eNB, the UE may perform a random access procedure such as steps S103 to S106 with the eNB. To this end, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a physical uplink shared channel (PUSCH) and/or a physical uplink control channel (PUCCH) to the eNB (S108), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 2:
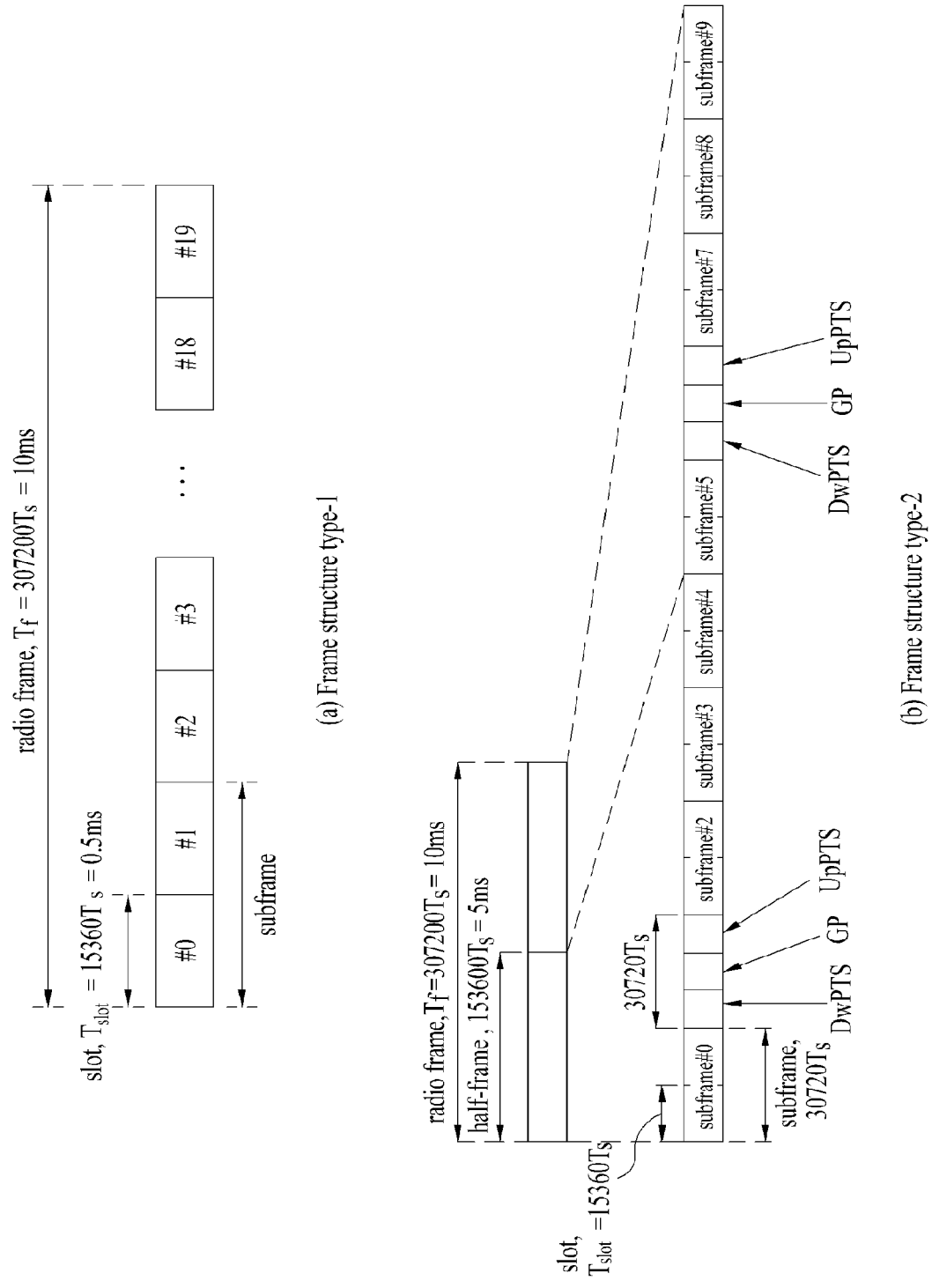
FIG. 2 illustrates a structure of a radio frame used in the present invention.

FIG. 2 illustrates a structure of a radio frame used in the present invention. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The GP is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is purely exemplary and thus the number of subframes in a radio frame, the number of slots in a subframe, or the number of symbols in a slot may vary in different ways.

Figure 3:
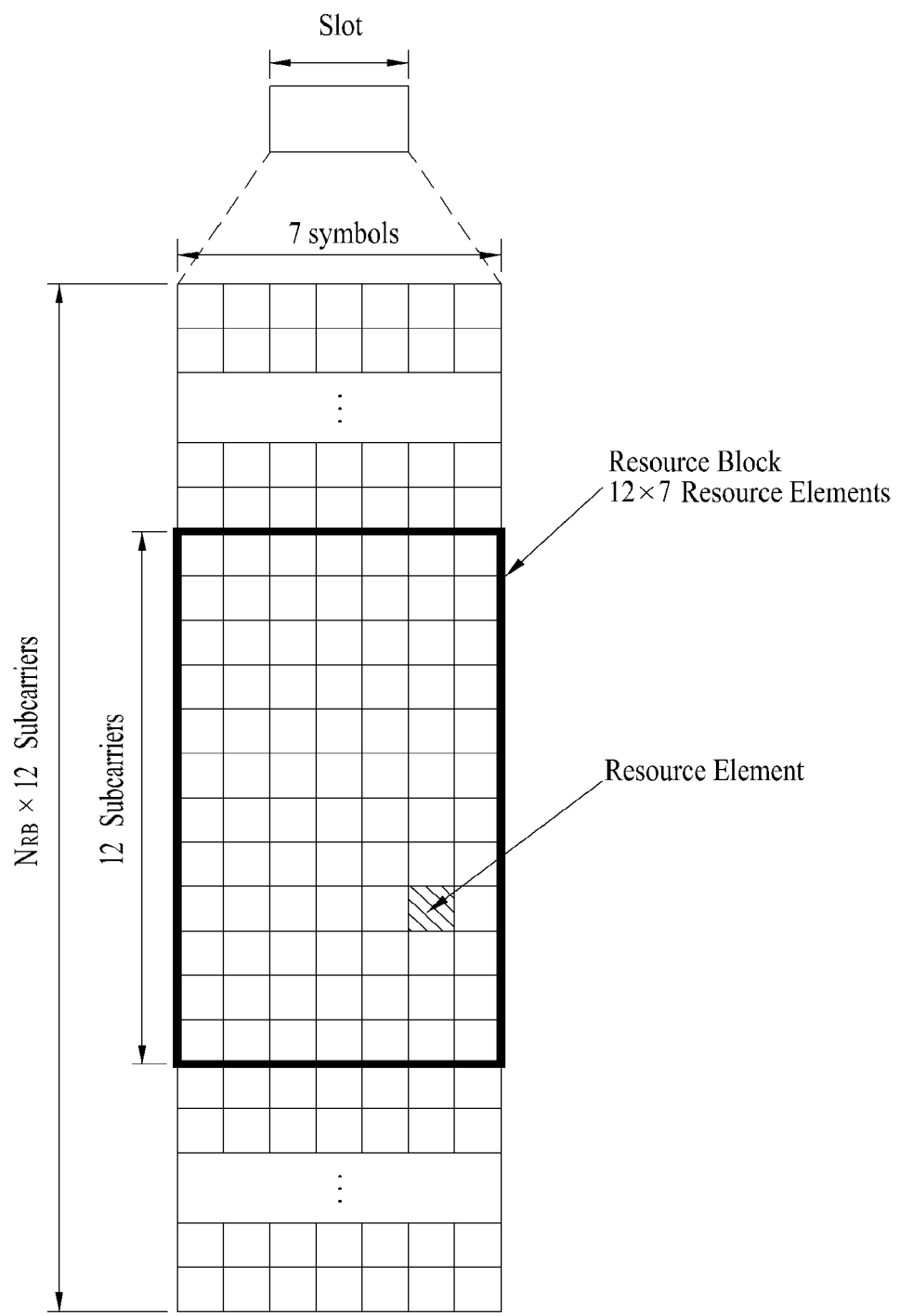
FIG. 3 illustrates a resource grid of one DL slot used in the present invention.

FIG. 3 illustrates a resource grid of one DL slot used in the present invention.

Referring to FIG. 3, a DL slot includes a plurality of OFDM symbols in the time domain. One DL slot may include 7 OFDM symbols and a resource block (RB) may include 12 subcarriers in the frequency domain. However, the present invention is not limited thereto. Each element of the resource grid is referred to as a Resource Element (RE). An RB includes 12×7 REs. The number of RBs in a DL slot, $N^{DL}$, depends on a DL transmission bandwidth. A UL slot may have the same structure as a DL slot.

Figure 4:
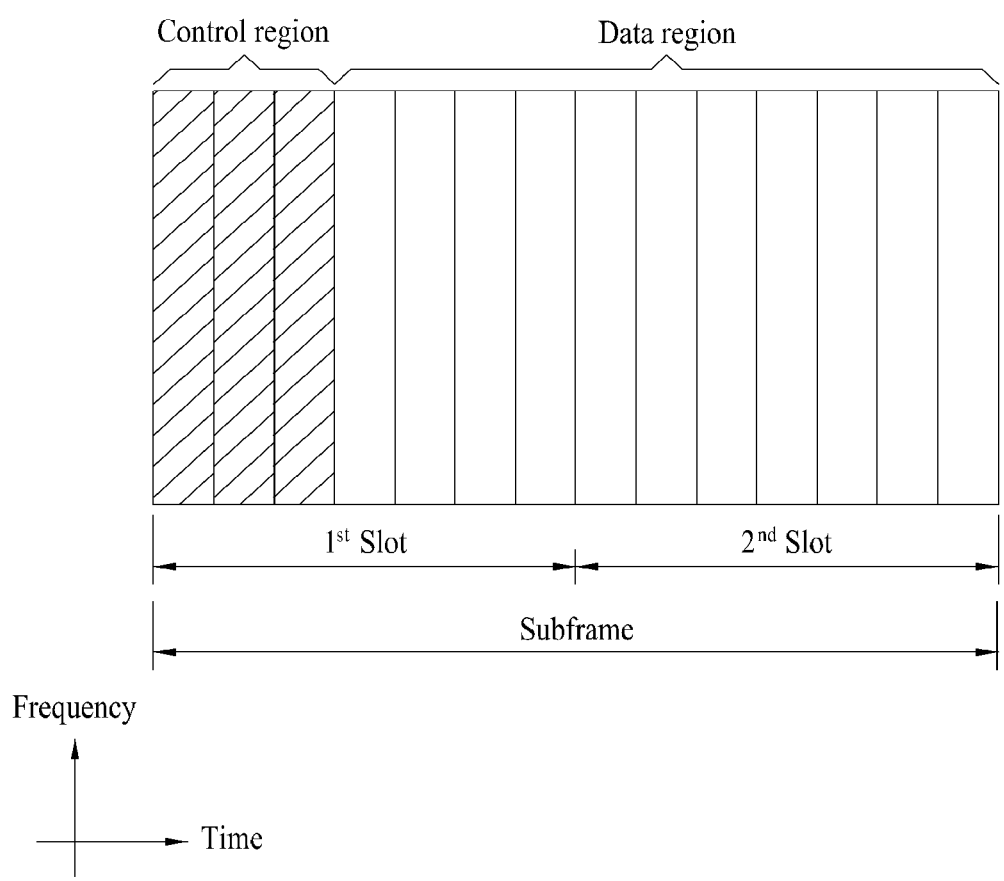
FIG. 4 illustrates a downlink subframe structure used in the present invention.

FIG. 4 illustrates a downlink subframe structure used in the present invention.

Referring to FIG. 4, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs) that are uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ acknowledgment (ACK)/not-acknowledgment (NACK) signal. The PHICH except for CRS and PCFICH (a first OFDM symbol) is allocated on the remaining REGs in one or more OFDM symbols configured by PHICH duration. The PHICH is allocated to three REGs that are distributed if possible on the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A plurality of PDCCHs can be transmitted within a control region. The UE can monitor the plurality of PDCCHs. The PDCCH is transmitted on an aggregation of one or several consecutive control channel elements (CCEs).

The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Each PDCCH is transmitted using one or more control channel elements (CCEs) and each CCE corresponds to nine sets of four resource elements. The four resource elements are referred to as a resource element group (REG). Four QPSK symbols are mapped to one REG. A resource element allocated to a reference signal is not included in an REG and thus a total number of REGs in a given OFDM symbol varies according to whether a cell-specific reference signal is present.

Table 3 shows the number of CCEs, the number of REGs, and the number of PDCCH bits according to PDCCH format.

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the SS has different sizes according to each PDCCH format. In addition, a UE-specific SS and a common SS are separately defined. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in an SS is referred to as blind decoding (blind detection). Through blind decoding, the UE simultaneously performs identification of the PDCCH transmitted to the UE and decoding of the control information transmitted through the corresponding PDCCH. For example, in the case where the PDCCH is de-masked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in an SS for a specific UE, the remaining CCEs are not present. Thus a BS may not find CCE resources in which the PDCCH is to be transmitted to all available UEs in a given subframe. In order to minimize the possibility that such blocking is subsequent to a next subframe, a start position of the USS is UE-specifically hopped.

Figure 5:
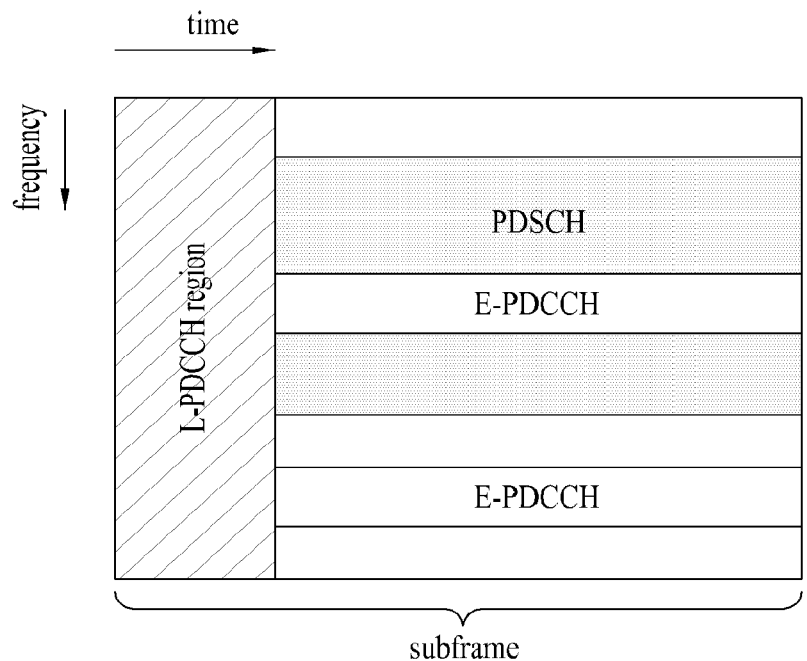
FIG. 5 illustrates an example of allocating an E-PDCCH in a subframe.

FIG. 5 illustrates an example of allocating an E-PDCCH in a subframe. In the conventional LTE system, PDCCH has a limitation of being transmitted in a limited number of symbols. Thus, in the LTE-A system, enhanced PDCCH (E-PDCCH) has been introduced for more flexible scheduling.

Referring to FIG. 5, a PDCCH (for convenience, legacy PDCCH or L-PDCCH) used in the conventional LTE(-A) system may be allocated to a control region of a subframe. An L-PDCCH region refers to a region to which the legacy PDCCH can be allocated. In the context, the L-PDCCH region may be referred to as a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 4). The PDCCH allocated to the data region is referred to as an E-PDCCH. As illustrated, a channel resource may be additionally ensured through the E-PDCCH to alleviate scheduling restrictions due to limited control channel resource of an L-PDCCH region. The E-PDCCH and a PDSCH are multiplexed in a data region in the manner of frequency division multiplexing (FDM).

In detail, the E-PDCCH may be detected/demodulated based on a DM-RS. The E-PDCCH may be configured to be transmitted over a PRB pair on a time axis. When E-PDCCH based scheduling is configured, a subframe for transmission/detection of an E-PDCCH may be designated. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and may attempt DCI detection on an L-PDCCH CSS and an L-PDCCH USS in a subframe (non-E-PDCCH subframe) in which transmission/detection of E-PDCCH is not allowed.

Like an L-PDCCH, an E-PDCCH carries DCI. For example, the E-PDCCH may carry DL scheduling information and UL scheduling information. An E-PDCCH/PDSCH procedure and an E-PDCCH/PUSCH procedure are the same/similar as described in steps S107 and S108 of FIG. 1. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The conventional LTE system pre-reserves a PDCCH candidate region (hereinafter, a PDCCH search space) in a control region and transmits a PDCCH of a specific UE in a part of the PDCCH candidate region. Accordingly, the UE may acquire a PDCCH of the UE in the PDCCH search space via blind decoding. Similarly, the E-PDCCH may be transmitted over a part or entire portion of a pre-reserved resource.

Figure 6:
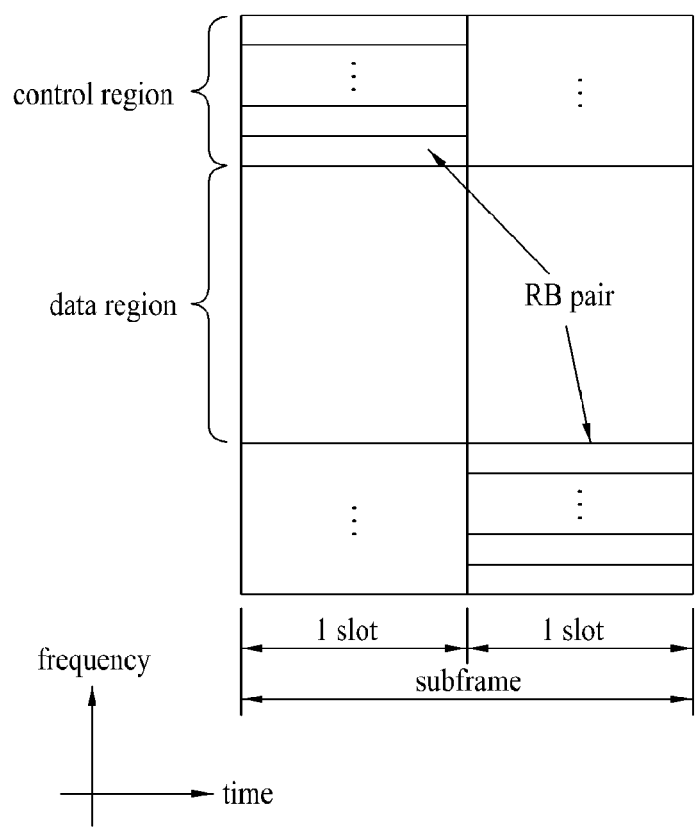
FIG. 6 illustrates an exemplary structure of an uplink subframe that may be used in LTE(-A) system.

FIG. 6 illustrates an exemplary structure of an uplink subframe that may be used in LTE(-A) system.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis, and performs hopping on the border of the slots.

The PUCCH may be used to transmit the following control information.

SR (Scheduling Request): information used to request uplink UL-SCH resource. The SR is transmitted using an on-off keying (OOK) scheme.

HARQ ACK/NACK: a response signal to the PDCCH indicating semi-persistent scheduling (SPS) release and a downlink data packet on the PDSCH. HARQ ACK/NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords.

CQI (Channel Quality Indicator): feedback information on a downlink channel. MIMO (Multiple Input Multiple Output) related feedback information includes a rank indicator (RI) and a precoding matrix indicator (PMI). 20 bits per subframe are used.

Figure 7:
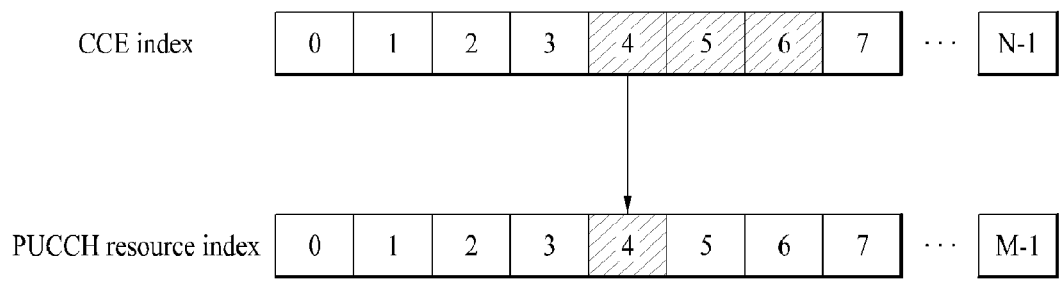
FIG. 7 illustrates an example of determining a PUCCH resource for transmitting an ACK/NACK signal.

FIG. 7 illustrates an example of determining a PUCCH resource for transmitting an ACK/NACK signal. A PUCCH resource for ACK/NACK information is not allocated to each UE in a cell in advance in LTE system, and a plurality of UEs in a cell share a plurality of PUCCH resources each time. Specifically, a PUCCH resource that a UE uses to transmit the ACK/NACK may correspond to a PDCCH that carries scheduling information regarding corresponding downlink data. In detail, one or more control channel elements (CCEs) construct a PDCCH transmitted to a UE in a downlink subframe, and ACK/NACK may be transmitted through a PUCCH resource corresponding to a specific CCE (e.g., the first CCE) among the CCEs constructing the corresponding PDCCH. A PUCCH resource comprises a cyclic shift, orthogonal cover code (or orthogonal spreading code), and a physical resource block (PRB).

Referring to FIG. 7, each rectangle in a DL Component Carrier (CC) represents a CCE and each square of a UL CC represents a PUCCH resource. Each PUCCH index indicates a PUCCH resource for an ACK/NACK. If information about a PDSCH is delivered on a PDCCH comprising CCEs 4, 5, and 6 as illustrated in FIG. 7, the UE transmits an ACK/NACK using PUCCH 4 corresponding to CCE 4 which is the most preceding of the CCEs constructing the PDCCH. FIG. 7 illustrates an exemplary case in which there are up to M PUCCHs in a UL CC, for a DL CC having up to N CCEs. While N may be equal to M, N and M may be different and thus the CCEs may be mapped to the PUCCHs in an overlapped manner.

Specifically, a PUCCH resource index is determined by the following equation in LTE system.

$$n_{PUCCH}^{(1)} = n_{CCE} + N_{PUCCH}^{(1)} \qquad \text{[Equation 1]}$$

Here, $n^{(1)}_{PUCCH}$ is a resource index for PUCCH format 1 used for transmission of ACK/NACK/DTX, $N^{(1)}_{PUCCH}$ is a value signaled via higher-layer signaling, and $n_{CCE}$ is the lowest index of CCE indexes used for PDCCH transmission. A cyclic shift, an orthogonal cover code (or an orthogonal spreading code), and a physical resource block (PRB) for PUCCH format 1 are derived from $n^{(1)}_{PUCCH}$.

Figure 8:
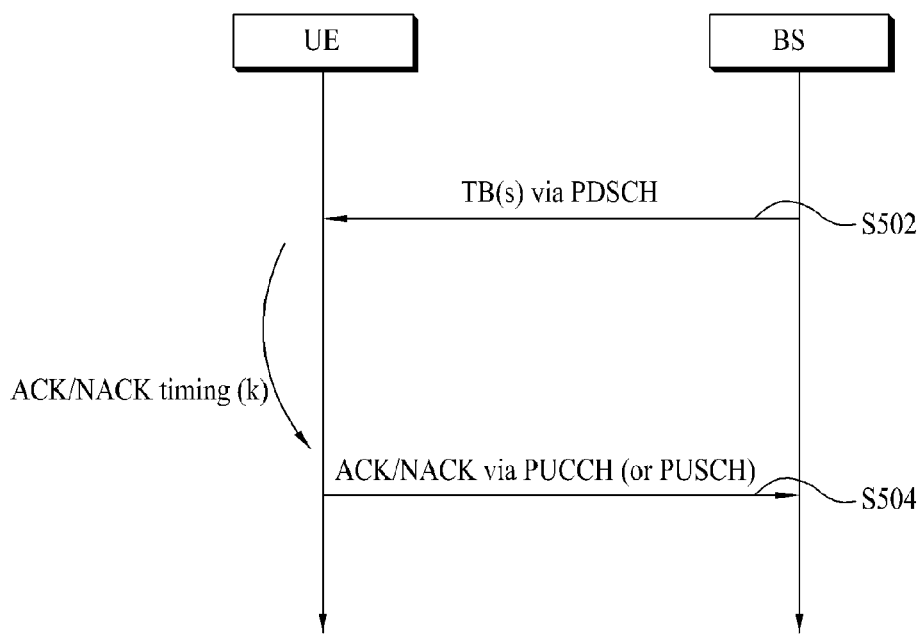
FIG. 8 illustrates a PDSCH-UL ACK/NACK timing.

FIG. 8 illustrates a PDSCH-UL ACK/NACK timing. UL ACK/NACK means ACK/NACK transmitted in uplink in response to DL data (for example, PDSCH).

Referring to FIG. 8, the user equipment may receive a PDSCH signal in a DL subframe (SF) (S802). The PDSCH signal is used to transmit one or a plurality of (for example, 2) transport blocks (TBs). In addition, although not shown, at step S802, a PDCCH signal indicating Semi-Persistent Scheduling (SPS) release may also be received. In a case in which the PDSCH signals and/or the SPS release PDCCH signal is present in the DL subframe, the user equipment transmits ACK/NACK in an UL subframe corresponding to the DL subframe through a process for transmitting ACK/NACK (for example, ACK/NACK (payload) generation, ACK/NACK resource assignment, etc.) (S804). The ACK/NACK includes reception response information for the PDSCH signal and/or the SPS release PDCCH signal of the step S802. The ACK/NACK is basically transmitted via a PUCCH. However, in a case in which PUSCH transmission is present at the time of transmitting the ACK/NACK, the ACK/NACK is transmitted via a PUSCH. Various PUCCH formats may be used for ACK/NACK transmission.

As described above, the ACK/NACK for data received in the M DL subframes is transmitted in one UL subframe in the TDD (that is, M DL subframe(s): 1 UL subframe). A relationship therebetween is given by a Downlink Association Set Index (DASI).

Table 4 indicates DASI(K:{$k_0, k_1, \ldots k_{M-1}$}) defined in LTE(-A). Table 4 indicates intervals between a UL subframe and DL subframes associated therewith from the viewpoint of the UL subframe transmitting ACK/NACK. Specifically, in a case in which a subframe n−k (k∈K) includes a PDCCH indicating PDSCH transmission and/or Semi-Persistent Scheduling (SPS) release, the user equipment transmits the ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 4-continued

| TDD UL-DL Configuration | 0 | 1 | 2 | 3 | 4 | 5 | 6 | 7 | 8 | 9 |
|---|---|---|---|---|---|---|---|---|---|---|
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 9:
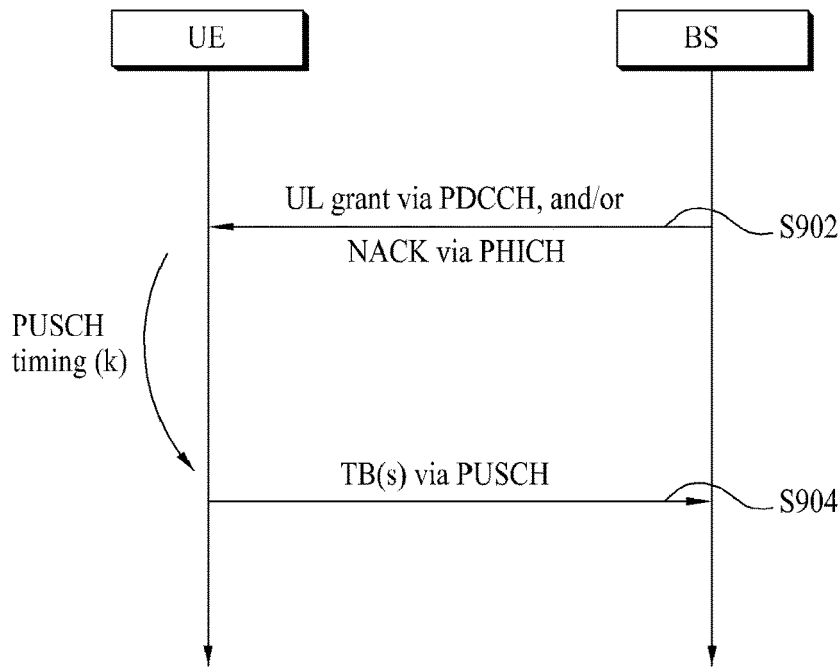
FIG. 9 illustrates a PHICH/UL grant-PUSCH timing.

FIG. 9 illustrates a PHICH/UL grant-PUSCH timing. A PUSCH may be transmitted in response to a PDCCH (UL grant) and/or a PHICH (NACK).

Referring to FIG. 9, the user equipment may receive a PDCCH (UL grant) and/or a PHICH (NACK) (S902). NACK indicates an ACK/NACK response to previous PUSCH transmission. In this case, the user equipment may initially transmit/retransmit one or more transmit blocks (TBs) via a PUSCH after k subframes through a PUSCH transmission process (for example, transmit block (TB) coding, transmit block (TB)-codeword (CW) swapping, PUSCH resource assignment, etc.) (S904). This example assumes a normal HARQ operation in which a PUSCH is transmitted once. In this case, PHICH/UL grant corresponding to PUSCH transmission are present in the same subframe. In case of subframe bundling in which the PUSCH is transmitted several times in a plurality of subframes, however, PHICH/UL grant corresponding to PUSCH transmission may be present in different subframes. For example, k may be 4 in FDD system, and k may be determined by Uplink Association Index (UAI) (k) in TDD system.

Table 5 indicates an Uplink Association Index (UAI) (k) for PUSCH transmission in LTE(-A) system. Table 5 indicates intervals between DL subframes and a UL subframe associated therewith from the viewpoint of the DL subframes in which PHICH/UL grant have been detected. Specifically, in a case in which a PHICH/UL grant is detected in a subframe n, the user equipment may transmit a PUSCH in a subframe n+k.

TABLE 5

| TDD UL/DL Configuration | 0 | 1 | 2 | 3 | 4 | 5 | 6 | 7 | 8 | 9 |
|---|---|---|---|---|---|---|---|---|---|---|
| 0 | 4 | 6 |   |   | 4 | 6 |   |   |   |   |
| 1 |   | 6 |   | 4 |   | 6 |   |   | 4 |   |
| 2 |   |   | 4 |   |   |   |   | 4 |   |   |
| 3 | 4 |   |   |   |   |   |   | 4 | 4 |   |
| 4 |   |   |   |   |   |   |   | 4 | 4 |   |
| 5 |   |   |   |   |   |   |   |   | 4 |   |
| 6 | 7 | 7 |   |   |   | 7 | 7 |   |   | 5 |

Figure 10:
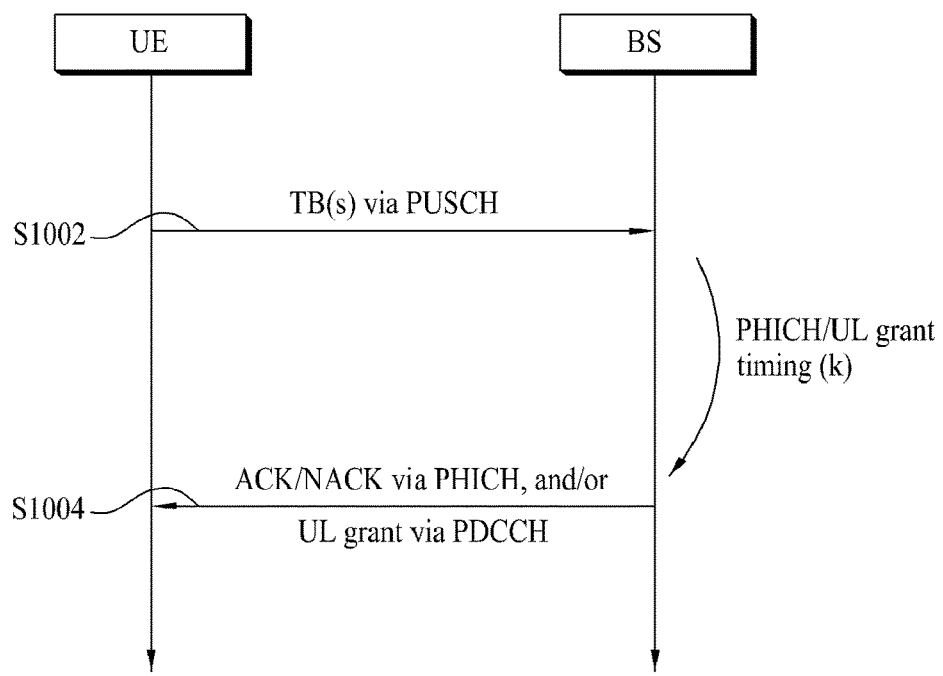
FIG. 10 illustrates a PUSCH-PHICH/UL grant timing.

FIG. 10 illustrates a PUSCH-PHICH/UL grant timing. A PHICH is used to transmit DL ACK/NACK. DL ACK/NACK means ACK/NACK transmitted in downlink in response to UL data (for example, PUSCH).

Referring to FIG. 10, the user equipment transmits a PUSCH signal to the base station (S1002). The PUSCH signal is used to transmit one or a plurality of (for example, 2) transport blocks (TBs) according to a transmission mode. In response to PUSCH transmission, the base station may transmit ACK/NACK to the user equipment via a PHICH after k subframes through a process for transmitting ACK/NACK (for example, ACK/NACK generation, ACK/NACK resource assignment, etc.) (S1004). The ACK/NACK includes reception response information for the PUSCH signal of step S1002. In addition, in a case in which a response to PUSCH transmission is NACK, the base station may transmit a UL grant PDCCH for PUSCH retransmission to the user equipment after k subframes (S1004). This example assumes a normal HARQ operation in which a PUSCH is transmitted once. In this case, PHICH/UL grants corresponding to PUSCH transmission are transmitted in the same subframe. In case of subframe bundling, however, PHICH/UL grants corresponding to PUSCH transmission may be transmitted in different subframes. For example, k may be 4 in FDD system, and k may be determined by Uplink Association Index (UAI) (k) in TDD system.

Table 6 indicates an Uplink Association Index (UAI)(k) for PHICH/UL grant transmission in LTE(-A) system. Table 6 indicates intervals between DL subframes and a UL subframe associated therewith from the viewpoint of the DL subframes in which PHICH/UL grants are present. Specifically, a PHICH/UL grant of a subframe i corresponds to PUSCH transmission of a subframe i-k.

TABLE 6

| TDD UL/DL Configuration | 0 | 1 | 2 | 3 | 4 | 5 | 6 | 7 | 8 | 9 |
|---|---|---|---|---|---|---|---|---|---|---|
| 0 | 7 | 4 |   |   |   | 7 | 4 |   |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   | 7 | 4 |   |   | 6 |

PHICH resources are given by [PHICH group index, orthogonal sequence index]. The PHICH group index and the orthogonal sequence index are decided using (i) the smallest PRB index and (ii) a value of a 3-bit field for DeModulation Reference Signal (DMRS) cyclic shift. (i) and (ii) are indicated by a UL grant PDCCH.

Figure 11:
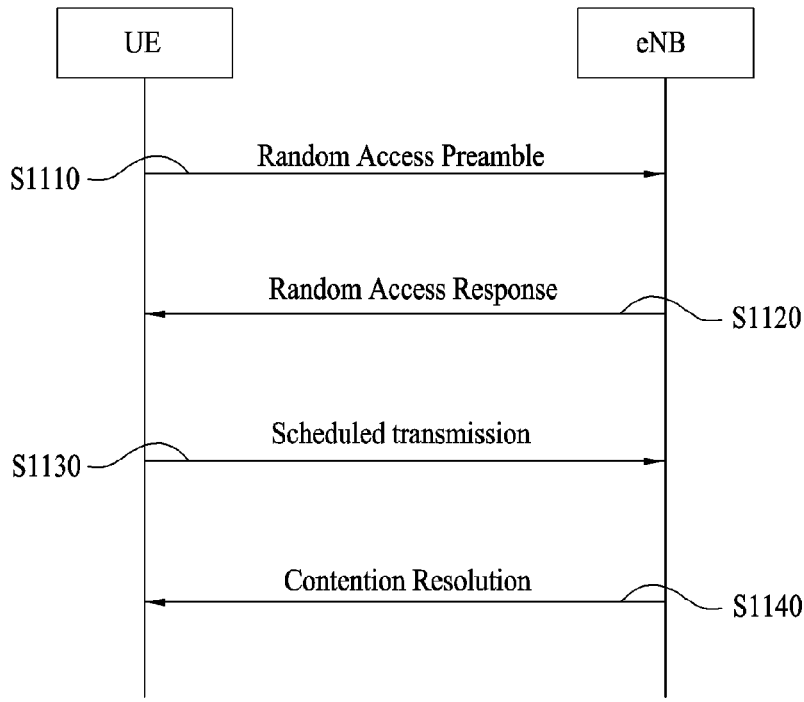
FIG. 11 illustrates a random access procedure.

FIG. 11 illustrates a random access procedure.

The random access procedure is used to transmit short-length data in uplink. For example, the random access procedure is performed upon initial access in an RRC_IDLE mode, upon initial access after radio link failure, upon handover requiring the random access procedure, and upon the occurrence of uplink/downlink data requiring the random access procedure during an RRC_CONNECTED mode. Some RRC messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 11, a UE receives and stores information regarding random access from an eNB through system information. Thereafter, when random access is needed, the UE transmits a random access preamble (referred to as Message 1) to the eNB (S1110). Upon receiving the random access preamble from the UE, the eNB transmits a random access response message (referred to as Message 2) to the UE (S1120). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3) through an uplink Shared Channel (SCH) according to radio resource allocation information included in the response information (S1130). After receiving the uplink message from the UE, the eNB transmits a message for contention resolution (referred to as Message 4) to the UE (S1140).

In case of a non-contention based procedure, a base station may allocate a non-contention random access preamble to a UE before the UE transmits a random access preamble (S1110). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S1110. If the base station receives the non-contention random access preamble from the UE, the base station may transmit a random access response (referred to as Message 2) to the UE in a similar manner as S1120.

During the above-described random access procedure, HARQ may not be applied to a random access response (S1120), but HARQ may be applied to an uplink transmission for the random access response or a message for contention resolution. Thus, the UE does not have to transmit ACK/NACK in response the random access response.

A next generation of LTE-A system is considering to configure a UE at a low cost/low specification mainly focusing on data communication such as metering of a gauge meter, measurement of a water level, utilization of a monitoring camera, inventory report of a vending machine, and the like. Such a UE is referred to as a machine type communication (MTC) UE or low complexity type UE for convenience. The MTC UE has a low data transmission amount and frequently transmits and receives data in uplink/downlink, and thus it is effective to reduce a cost of the device and battery consumption according to the low data transmission amount. The MTC UE has low mobility and thus a channel environment is rarely changed. In consideration of a poor situation in which the MTC UE is installed in a coverage-limited place such as a basement as well as a building and a factory, research has currently been conducted into various coverage enhancement schemes such as a repeated transmission method for a MTC UE for each channel/signal.

In the present specification, a UE according to a legacy LTE-A system may be referred to as a normal UE or a first type UE, and an MTC UE may be referred to as a second type UE or low complexity type (LCT) UE. Alternatively, a UE with a normal coverage (to which repetition is not applied) may be referred to as a first type UE, and a coverage-limited UE (to which repetition is applied) may be referred to as a second UE or an LCT UE. Alternatively, a UE to which repetition of the same signal/channel is not applied may be referred to as a first type UE, and a UE to which repetition is applied may be referred to as a second type UE or a coverage enhanced (CE) UE. For example, in the case of the second type UE, the number of reception antennas may be reduced, the number of transport blocks (TBs) to be supported may be reduced, and a transmission and reception frequency range may be reduced. More specifically, the second type UE may have one transmit antenna and one receive antenna, support only one TB, and support only a frequency range equal to or less than 6 resource blocks (RBs).

When a signal is transmitted in a coverage-limited environment, signal intensity may be weak as compared with noise. However, when the same signal/channel is repeatedly transmitted, the signal intensity may be continuously accumulated and may be increased, but noise has random properties and thus noise may be counter-balanced so as to be maintained at a predetermined level. Accordingly, coverage may be enhanced via repeated transmission of the same signal in a coverage-limited environment.

A signaling/configuring method for signal transmission and reception based on repeated transmission for coverage enhancement of the second type UE will be proposed. In the present specification, a signal/channel repeated transmission period corresponding to one repetition number of times for repeated transmission of the same signal may be referred to as a "bundle" or "bundle interval" for convenience. An repetition number for each signal/channel may be independently configured for coverage enhancement, and the repetition number of times may include "1". When a repetition number of times is 1, this means one-time transmission without repetition and in this case, a bundle interval may be one subframe. In addition, the PDCCH described in the present invention may include both a PDCCH and an EPDCCH, and the CCE may include both a CCE and an ECCE. In the present specification, the repeated transmission may be simply referred to as repetition.

Figure 12:
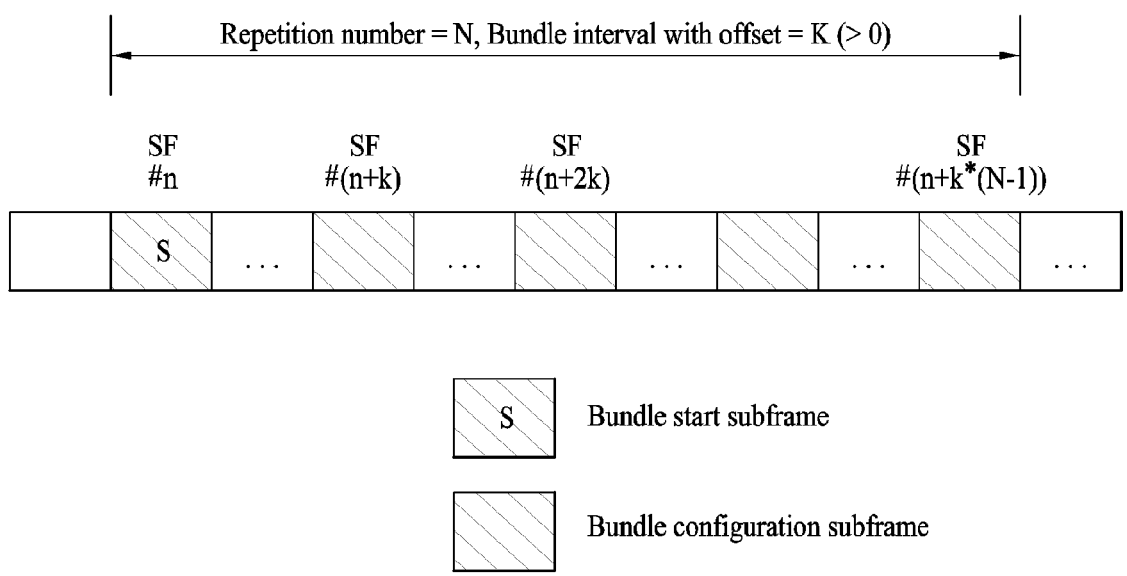
FIG. 12 illustrates a bundle interval according to the present invention.

FIG. 12 illustrates a bundle interval according to the present invention.

Referring to FIG. 12, the same channel/signal may be transmitted and received once in one subframe and transmitted and received with a specific offset a total of N repetition number of times over N (>0) subframes. In this case, a subframe in which a channel/signal is initially transmitted and received may be referred to as a bundle start subframe S (refer to FIG. 12), a subframe in which a channel/signal is lastly transmitted and received may be referred to as a bundle end subframe, and an interval to the bundle end subframe from the bundle start subframe may be referred to as a bundle or a bundle interval. In addition, a subframe in which a channel/signal is transmitted and received in a bundle or a bundle interval may be referred to as a bundle configuration subframe. Accordingly, the same channel/signal may be transmitted and received every bundle configuration subframe from the bundle start subframe S (refer to FIG. 12). In addition, subframes constituting the bundle interval may each be configured with a specific offset k. For example, when the specific offset k is 1, the bundle interval may be configured with N consecutive subframes. In the present specification, for convenience of description, it may be assumed that the bundle interval includes consecutive subframes, but the present invention may also be applied to the case, in which an offset has a value equal to or greater than 1, in the same manner.

HARQ-ACK Repeated Transmission

A second type UE may configure/perform HARQ-ACK repeated transmission. As one method for HARQ-ACK repeated transmission (when repetition is applied to HARQ-ACK transmission), when a plurality of information items about HARQ-ACK repetition number of times and HARQ-ACK bundle start/configuration subframe (SF) (i.e., information about the HARQ-ACK bundle start subframe and/or the HARQ-ACK bundle configuration subframe) and PUCCH resource sets to be allocated to corresponding bundle intervals (or respective subframes (SFs) included in the bundle interval) are pre-configured (via a higher layer signal such as RRC signaling), a set among the corresponding PUCCH resource sets, which is used to (repeatedly) transmit HARQ-ACK feedback for (corresponding) DL data, may be signaled through DL grant DCI, based on a resource in which the corresponding DCI is transmitted, or based on a resource allotted to DL data transmission corresponding to the corresponding DCI.

For example, when the corresponding set is signaled through the DL grant DCI, a method for adding a new field to corresponding DCI or employing/referring to an existing field (e.g., TPC or HARQ process number) in the corresponding DCI may be used. In addition, for example, when the set is signaled based on the resource in which the DCI is transmitted, a system frame number (SFN)/subframe (SF) number, and/or a used CCE index corresponding to the corresponding PDCCH/EPDCCH repetition start/end time point may be used as a reference. In addition, for example, when the set is signaled based on the resource allocated to DL data transmission, an SFN/SF number, and/or used PRB index corresponding to the corresponding PDSCH repetition start/end time point may be used as a reference. In this method, HARQ-ACK repeated transmission may be performed based on one repetition number of times (bundle start/configuration SF corresponding thereto) and a plurality of PUCCH resource (sets).

As another method, when a plurality of repetition numbers (bundle start/configuration SF information items respectively corresponding thereto) and one PUCCH resource (set) (which is common to all repetition numbers) or a plurality of PUCCH resource (sets) (which are applied for the respective repetition numbers) are pre-configured, a number of times/resource information items among the corresponding repetition number of times/resource information items, which is used to (repeatedly) transmit HARQ-ACK feedback for (corresponding) DL data may be signaled through DL grant DCI, based on a resource in which the corresponding DCI is transmitted, or a resource allocated to DL data transmission corresponding to the DCI.

As another method for the HARQ-ACK repeated transmission, when PUCCH repetition number of times and corresponding PUCCH bundle start/configuration SF information for HARQ-ACK transmission are pre-configured, in consideration of an (implicit) PUCCH resource (hereinafter, referred to as "im-PUCCH") (e.g., refer to FIG. 7) linked with a resource in which DL grant DCI is transmitted, a method for performing HARQ-ACK repeated transmission using a PUCCH resource corresponding to a PUCCH index obtained by applying a specific PUCCH index offset to a corresponding im-PUCCH index (e.g., obtained by adding a specific PUCCH index offset) may be considered in order to prevent collision with (implicit) PUCCH transmission from a legacy UE that performs HARQ-ACK feedback without repetition. For example, the resource in which the DL grant DCI is transmitted may refer to a used CCE index and/or an SFN/SF number corresponding to a corresponding PDCCH/EPDCCH repetition start or end time point. For example, a specific PUCCH index offset may be set to different values according to PUCCH repetition number of times (or as a function of PUCCH repetition number of times).

PDSCH Repeated Transmission

A similar principle to the above description may also be applied to PDSCH repeated transmission. (When repetition is applied to PDSCH transmission) if a plurality of information items about PDSCH repetition number of times and PDSCH bundle start/configuration SF and PDSCH resource/transmission sets to be allocated to a corresponding bundle interval (SFs included therein) are pre-configured, a set among the corresponding resource/transmission information sets, which is used to (repeatedly) transmit a specific PDSCH may be signaled. For example, the PDSCH resource/transmission information may include at least one of a resource block (RB) region, a modulation and coding scheme (MCS) level, and a transport block (TB) size. For example, when a resource/transmission information set among the resource/transmission information sets, which is to be used for PDSCH repeated transmission, may be indicated via RRC signaling through DL grant DCI or the like or indicated based on a resource in which the corresponding DCI is transmitted. This method is based on one repetition number of times (a bundle start/configuration SF corresponding thereto) and a plurality of PDSCH resource/transmission information items (sets).

As another method, when a plurality of repetition numbers (bundle start/configuration SF information items respectively corresponding thereto) and one resource/transmission information item (set) (which is common to all repetition numbers) or a plurality of PDSCH resource/transmission information items (sets) (which are applied to the respective repetition numbers) are pre-configured, information among the corresponding repetition number/resource information items, which is used to (repeatedly) transmit a specific PDSCH, may be signaled. For example, the repetition number of times/resource information to be used to (repeatedly) transmit a PDSCH among the repetition number of times/resource information items may be signaled via RRC signaling, through DL grant DCI or the like, or based on a resource in which the corresponding DCI is transmitted.

PHICH Repeated Transmission

A similar principle to the above description may also be applied to PHICH repeated transmission. (When repetition is applied to PHICH transmission) if a plurality of information items about PHICH repetition number of times and PHICH bundle start/configuration SF and a plurality of PHICH resource sets to be allocated to a corresponding bundle interval (SFs included therein) are pre-configured, a set among the corresponding PHICH resource sets, which is used to (repeatedly) transmit ACK/NACK feedback for (corresponding) UL data may be signaled through UL grant DCI, based on a resource in which the corresponding DCI is transmitted, or based on a resource allocated to UL data transmission corresponding to the corresponding DCI. This method may be based on one repetition number of times (bundle start/configuration SF information corresponding thereto) and a plurality of PHICH resource sets.

For example, when the set is signaled through the UL grant DCI, a method for adding a new field to corresponding DCI or employing/referring to an existing field (e.g., TPC or DMRS cyclic shift) in the corresponding DCI may be used. In addition, for example, when the set is signaled based on the resource in which the DCI is transmitted, a used CCE index, and/or a system frame number (SFN)/subframe (SF) number corresponding to the corresponding PDCCH/EPDCCH repetition start/end time point may be used as a reference. In addition, for example, when the set is signaled based on the resource allocated to UL data transmission corresponding to the corresponding DCI, used PRB index, and/or an SFN/SF number corresponding to the corresponding PUSCH repetition start/end time point may be used. In this method, ACK/NACK repeated transmission may be performed based on one repetition number of times (bundle start/configuration SF corresponding thereto) and a plurality of PHICH resource (sets).

As another method, when a plurality of repetition numbers (bundle start/configuration SF information items respectively corresponding thereto) and one PHICH resource (set) (which is common to all repetition numbers) or a plurality of PHICH resource (sets) (which are applied for the respective repetition numbers) are pre-configured, a repetition number/resource information item among the corresponding repetition numbers/resource information items, which is used to (repeatedly) transmit ACK/NACK feedback for (corresponding) UL data may be signaled through UL grant, based on a resource in which the corresponding DCI is transmitted, or a resource allocated to UL data transmission corresponding to the DCI.

As another method for PHICH repeated transmission, when PHICH repetition number of times and corresponding PHICH bundle start/configuration SF information are pre-configured, in consideration of an (implicit) PHICH resource (hereinafter, referred to as "im-PHICH") linked with a resource allocated to UL data transmission, a method for performing PHICH repeated transmission using a PHICH resource corresponding to a PHICH index obtained by applying a specific PHICH index offset to a corresponding im-PHICH index (e.g., obtained by adding a specific PHICH index offset) may be considered in order to prevent collision with (implicit) PHICH transmission from a legacy UE that performs PHICH reception without repetition. For example, the resource allocated to UL data transmission may refer to a used PRB index and/or an SFN/SF number corresponding to a corresponding PUSCH repetition start/end time point. For example, a corresponding specific PHICH index offset may be set to different values according to PHICH repetition number of times (or as a function of PHICH repetition number of times).

PUSCH Repeated Transmission

A similar principle to the above description may also be applied to PUSCH repeated transmission. (When repetition is applied to PUSCH transmission) if a plurality of information items about PUSCH repetition number of times and PUSCH bundle start/configuration SF and PUSCH resource/transmission sets to be allocated to a corresponding bundle interval (SFs included therein) are pre-configured, a set among the corresponding resource/transmission information sets, which is used to (repeatedly) transmit a specific PUSCH may be signaled. For example, the PUSCH resource/transmission information may include at least one of an RB region, an MCS level, and a TB size. For example, when a resource/transmission information set among the resource/transmission information sets, which is to be used for PUSCH repeated transmission, may be signaled via RRC signaling, through UL grant DCI or the like, or based on a resource in which the corresponding DCI is transmitted. This method is based on one repetition number of times (a bundle start/configuration SF corresponding thereto) and a plurality of PUSCH resource/transmission information items (sets).

As another method, when a plurality of repetition numbers (bundle start/configuration SF information items respectively corresponding thereto) and one (which is common to all repetition numbers) or a plurality of PUSCH resource/transmission information items (sets) (which are applied to the respective repetition numbers) are pre-configured, information among the corresponding repetition number/resource information items, which is used to (repeatedly) transmit a specific PUSCH, may be signaled. For example, the repetition number/resource information to be used to (repeatedly) transmit a PUSCH among the repetition numbers/resource information items may be signaled via RRC signaling, through UL grant DCI or the like, or based on a resource in which the corresponding DCI is transmitted.

Collision Handling Between Channel Bundles

In a coverage-limited environment, a bundle interval may be frequently scheduled/configured such that a bundle interval of a specific channel/signal is started (i.e., initial channel transmission of the corresponding bundle is performed) before a bundle interval of another specific channel/signal is ended (i.e., last channel transmission of the corresponding bundle is performed). For convenience of description, when bundle intervals overlap each other, a channel/signal transmitted in a preceding bundle interval is referred to as "CH1" and a channel/signal transmitted in the following bundle interval is referred to as "CH2". Accordingly, when a bundle interval of CH2 starts before a bundle interval of CH1 ends, overlap between the two bundle intervals may occur. When two different bundle intervals overlap each other, the corresponding bundle intervals may collide.

As such, when a plurality of channel bundle intervals overlap, it may be necessary to determine a rule for a UE transmitting operation so as to discard/skip transmission of a specific channel bundle and transmit only the remaining channel bundles according to channel protection priority. To this end, the case in which bundle transmission of CH1 is discarded/skipped or stopped/suspended and bundle transmission of CH2 is started according to scheduled/configured timing (which is simply referred to as "CH1-drop case") and the opposite case in which bundle transmission of CH1 is maintained and bundle transmission of CH2 is discarded/skipped (which is simply referred to as "CH2-drop case") will now be proposed.

(1) CH1-Drop Case

A. When CH1 is a periodic channel/signal (e.g., periodic CSI, SR, and periodic SRS) and CH2 is an aperiodic channel/signal (e.g., HARQ-ACK, PUSCH, PRACH, and aperiodic SRS): The possibility that an eNB schedules/configures a bundle interval for an aperiodic channel/signal while knowing overlap with a bundle interval for a periodic channel/signal is high, and thus it may be assumed that the eNB prioritizes transmission of an aperiodic channel/signal. The periodic channel/signal may be transmitted and received at a next period, but transmission of the aperiodic channel/signal may be just one time event, and thus transmission of the aperiodic channel/signal may be prioritized.

B. When CH1 is HARQ-ACK and CH2 is PUSCH: The possibility that an eNB schedules/configures a PUSCH bundle interval while knowing that a HARQ-ACK bundle interval is present is high, and thus it may be assumed that the eNB prioritizes PUSCH transmission.

C. When CH1 is PUSCH and CH2 is HARQ-ACK: The possibility that an eNB schedules/configures a HARQ-ACK bundle interval while knowing that a PUSCH bundle interval is present is high, and thus it may be assumed that the eNB prioritizes HARQ-ACK transmission.

D. When both CH1 and CH2 are HARQ-ACK: Since CH1 and CH2 are the same type of channel/signal, it may be assumed that an eNB prioritizes transmission of following HARQ-ACK.

E. When both CH1 and CH2 are PUSCHs: Since CH1 and CH2 are the same type of channel/signal, it may be assumed that an eNB prioritizes transmission of following PUSCH.

F. When CH2 is a PRACH: Since the PRACH is a channel/signal that is spontaneously transmitted by a UE without scheduling of an eNB, the eNB cannot know whether the PRACH is transmitted. In this case, the UE may autonomously prioritize transmission of the PRACH.

(2) CH2-Drop Case

A. When CH1 is an aperiodic channel/signal (e.g., HARQ-ACK, PUSCH, PRACH, and periodic SRS) and CH2 is a periodic channel/signal (e.g., periodic CSI, SR, and periodic SRS): The possibility that an eNB schedules/configures a bundle interval for an aperiodic channel/signal while knowing overlap with a bundle interval for a periodic channel/signal is high, and thus it may be assumed that the eNB prioritizes transmission of an aperiodic channel/signal. The periodic channel/signal may be transmitted and received at a next period, but transmission of the aperiodic channel/signal may be just one time event, and thus transmission of the aperiodic channel/signal may be prioritized.

B. When CH1 is PRACH: Since the PRACH is a channel/signal that is spontaneously transmitted by a UE without scheduling of an eNB, the eNB cannot know whether the PRACH is transmitted. In this case, the UE may autonomously prioritize transmission of the PRACH.

Configuration of Repetition Information for Transmission of System Information Block (SIB)

In a legacy system, SIB1 is used/transmitted in order to provide scheduling information about other SIBs (e.g., SIB2, SIB3, etc.) containing actual system information. For convenience of description, SIBs including real system information are referred to as real-SIB, and some real-SIBs (such as SIB2) required for a coverage-limited second type UE among the legacy real-SIBs and/or a second type dedicated SIB or the like that is added/defined as being dedicated to a coverage-limited second type UE may be referred to as a real-SIB for a second type UE (or real-SIB for MTC or LCT) or a second type real-SIB. In consideration of a coverage-limited situation, SIB1 may be the same as a legacy SIB1 or may refer to an SIB that performs a similar function (e.g., function of providing scheduling information about another second type dedicated SIB) to the legacy SIB1 among SIBs added/defined as being dedicated to a coverage-limited second type UE. In a coverage-limited situation, the SIB1 may include repetition related information for real-SIB transmission for a second type UE. For example, repetition related information for transmission of real-SIB (or second type real-SIB) for a second type UE may include a repetition number of times applied to transmission of a second type real-SIB and/or a start/configuration SF for bundle transmission of a second type real-SIB and/or a period for transmission of a bundle of a second type real-SIB. When SIB1 is the same as a legacy SIB1, the SIB1 may be referred as an SIB1, and when the SIB1 is added/defined as being dedicated to the second type UE, the SIB1 may be referred to as a second type dedicated SIB1.

A (legacy or second type dedicated) SIB1 may include repetition related information of the corresponding SIB1. For example, the (legacy or second type dedicated) SIB1 may include repetition number of times applied to the SIB1 and/or a start/configuration SF of SIB1 bundle transmission and/or a period for transmission of an SIB1 bundle.

As another method, a (legacy or second type dedicated) SIB1 (which contains the repetition related information) may include DCI information about the second type dedicated SIB. For example, the second type dedicated SIB may include a legacy real-SIB or may correspond to a real-SIB (or real-SIB for MTC) for the second type UE. In addition, for example, DCI information about the second type dedicated SIB may include RB resource allocation, a TB size, a MCS level, and so on. Accordingly, the second type dedicated SIB may be configured/transmitted in the form of a PDSCH (bundle) that is not accompanied by corresponding PDCCH (i.e., PDCCH for scheduling a corresponding SIB) transmission.

Subframe (SF) Configuration for PDSCH Repetition

In a legacy system, (UE-common) signals such as SIB, paging, and RAR/Msg4 as well as normal unicast (or UE-specific) data may be transmitted through a PDSCH. Repetition may also be applied a common message (e.g., SIB/paging/RAR/Msg4) transmitted to a coverage-limited second type UE. For convenience of description, a repetition based common message or common Msg transmitted to the second type UE is referred to as a "common Msg bundle" and a common message transmitted to a legacy UE is referred to as a "legacy common Msg".

First, for more flexible eNB scheduling, a common message (e.g., SIB and/or paging and/or RAR and/or Msg4) bundle (for a second type UE) may be repeatedly transmitted through an SF set including SFs (e.g., consecutive SFs except for the corresponding SF) other than an SF in which the legacy SIB is transmitted (or SF configured to transmit the legacy SIB), and/or, a common message (e.g., SIB and/or paging and/or RAR and/or Msg4) bundle (for a second type UE) may be repeatedly transmitted through an SF set including SFs (e.g., consecutive SFs except for the corresponding SF) other than an SF in which the legacy paging is transmitted (or SF configured to transmit the legacy paging), and/or, a specific common message (e.g., RAR and/or Msg4) bundle (for a second type UE) may be repeatedly transmitted through an SF set including SFs (e.g., consecutive SFs except for the corresponding SF) but not an SF in which the above SIB bundle (for the second type UE) is transmitted (or SF configured to transmit the above SIB bundle).

A normal PDSCH bundle for carrying UE-specific data (for a second type UE) may be repeatedly transmitted through an SF set including SFs (e.g., consecutive SFs except for the corresponding SFs) other than an SF in which the legacy SIB is transmitted (or SF configured to transmit the legacy SIB) and/or other than an SF in which the legacy paging is transmitted (or SF configured to transmit the legacy paging) and/or other than an SF in which the SIB bundle is transmitted (or SF configured to transmit the SIB bundle).

In a coverage-limited situation, repetition may be applied to transmission of a PDSCH (in particular, a PDSCH for carrying UE-specific data) and transmission of a (DL grant) PDCCH for scheduling the PDSCH transmission, and SF timing (hereinafter, referred to as a PDCCH_start_SF) at which PDCCH bundle transmission can be started and SF timing (hereinafter, referred to as a PDSCH_start_SF) at which PDSCH bundle transmission can be started may be preconfigured. In this case, when reception/detection of a PDCCH bundle that begins to be transmitted in a specific PDCCH_start_SF is successful, transmission of a PDSCH bundle corresponding to the reception/detection (or scheduled according to the reception/detection) may be started in a next closest PDSCH_start_SF in addition to a last (or initial) SF (or SF timing obtained by adding specific SF offset to the SF) included in the corresponding PDCCH bundle.

Figure 13:
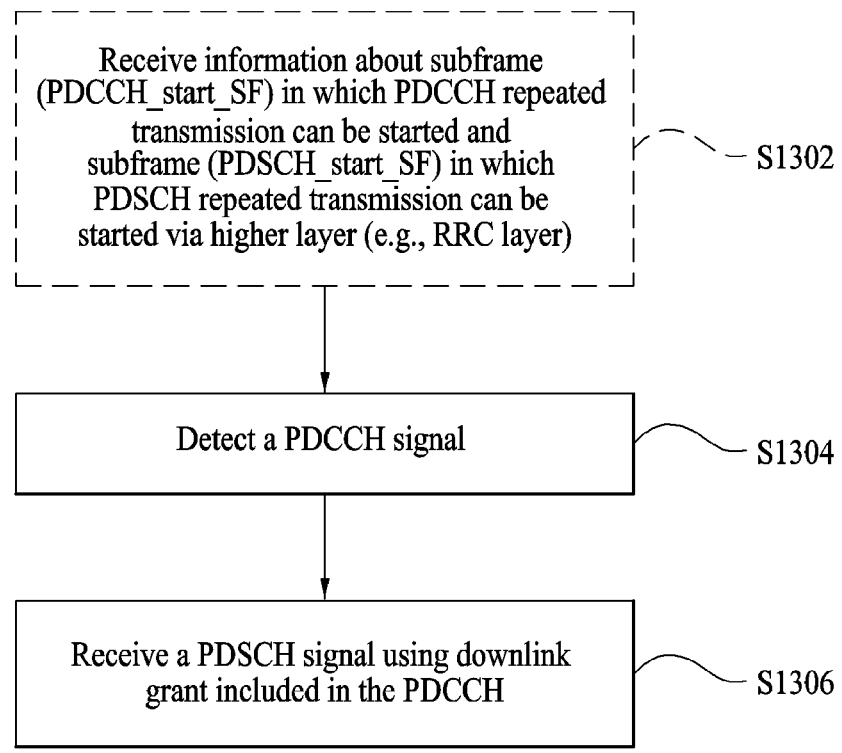
FIG. 13 is a flowchart of a method for receiving a PDCCH and a PDSCH according to the present invention.

FIG. 13 is a flowchart of a method for receiving a PDCCH and a PDSCH according to the present invention.

Referring to FIG. 13, a method for receiving a PDCCH signal and a PDSCH signal may be changed according to a UE type. When a UE is a first type UE (or normal UE), the UE may detect the PDCCH signal and acquire DL grant from the detected PDCCH signal in the step S1304. In the step S1306, the UE may receive the PDSCH signal in a subframe in which the PDCCH signal is detected using the DL grant included in the PDCCH signal. In this case, the PDCCH signal may be received/detected through a control region (e.g., L-PDCCH) or a data region (e.g., E-PDCCH) of the subframe, and the PDSCH signal may be received through the data region of the subframe (e.g., refer to FIG. 4 or 5).

On the other hand, when the UE is a second type UE (or LCT UE), the UE may receive information about a subframe (e.g., PDCCH_start_SF) in which PDCCH repeated transmission can be started and a subframe (e.g. PDSCH_start_SF) in which PDSCH repeated transmission can be started through a higher layer (e.g., RRC layer) in the step S1302. For example, the information about a subframe (e.g., PDCCH_start_SF) in which PDCCH repeated transmission can be started and a subframe (e.g. PDSCH_start_SF) in which PDSCH repeated transmission can be started may be received through system information (e.g., second type real-SIB). In the step S1304, the UE may repeatedly receive a PDCCH during a PDCCH bundle interval including a plurality of subframes from the subframe (e.g., PDCCH_start_SF) in which PDCCH repeated transmission can be started to successfully detect the PDCCH. In the step S1306, the UE may begin to repeatedly receive a PDSCH from a subframe (e.g., PDSCH_start_SF) in which PDSCH repeated transmission can be started and which is closest to a last (or initial) subframe of a PDCCH bundle interval including a first plurality of subframes and may receive a PDSCH during a PDSCH bundle interval including a second plurality of subframes. As another example, in the step S1304, the UE may begin to repeatedly receive a PDSCH from a subframe (e.g., PDSCH_start_SF) in which PDSCH repeated transmission can be started and which is closest to a subframe obtained by adding a specific offset to a last (or initial) subframe of a PDCCH bundle interval including the first plurality of subframes and may receive a PDSCH during a bundle interval including the second plurality of subframes.

In the example of FIG. 13, it is assumed that a bundle interval includes a plurality of subframes, but the present invention may be applied to the case in which the bundle interval is configured with one subframe (e.g., when a repetition number of times is 1) in the same way.

According to a similar operating principle, SF timing (hereinafter, referred to as a PUCCH_start_SF) in which PUCCH bundle transmission for HARQ-ACK transmission can be started may be preconfigured. In this case, transmission of HARQ-ACK PUCCH bundle corresponding to PDSCH bundle reception may be started in a next closest PUCCH_start_SF in addition to a last (or initial) SF (or SF timing obtained by adding specific SF offset to the SF) included in the corresponding PDSCH bundle. For example, transmission of a HARQ-ACK PUCCH bundle may be started in a next closest PUCCH_start_SF after a last subframe of a corresponding PDSCH bundle, a subframe obtained by adding a specific subframe offset to the last subframe of the PDSCH bundle, an initial subframe of the corresponding PDSCH bundle, or a subframe obtained by adding a specific subframe offset to the initial subframe of the corresponding PDSCH bundle.

For example, in the case of PUCCH transmission, a PUCCH transmission method may also be changed according to a PUCCH transmission terminal. When the UE is a first type UE (or normal UE), the UE may transmit a PUCCH signal in a subframe obtained by adding a specific offset to a subframe in which a PDSCH signal is received (e.g., refer to the description associated with FIG. 8). For example, the specific offset may be 4 in an FDD system and may be determined according to Table 4 above in a TDD system.

On the other hand, when a UE is a second type UE (or LCT UE), the UE may receive information about a subframe (e.g., PUCCH_start_SF) in which PUCCH repeated transmission can be started through a higher layer (e.g., RRC layer). For example, the information about the subframe (e.g., PUCCH_start_SF) in which the PUCCH repeated transmission can be started may be received through the system information (e.g., second type real-SIB), and information about the subframe (e.g., PDCCH_start_SF) in which PDCCH repeated transmission can be started and information about the subframe (e.g., PDSCH_start_SF) in which PDSCH repeated transmission can be started may be received through the same SIB or different SIBs. The UE may repeatedly receive a PDSCH during a PDSCH bundle interval including a second plurality of subframes from a subframe (e.g., PDSCH_start_SF) in which PDSCH repeated transmission can be started and then may begin to perform repeated transmission of a PUCCH from a subframe (e.g., PUCCH_start_SF) in which PUCCH repeated transmission can be started and which is closest to a last (or initial) subframe of a PDSCH bundle interval including the second plurality of subframes to transmit a PUCCH during a PUCCH bundle interval including a third plurality of subframes. As another example, the UE may begin to perform repeated transmission of a PUCCH from a subframe (e.g., PUCCH_start_SF) in which PUCCH repeated transmission can be started and which is closest to a subframe obtained by adding a specific offset to a last (or initial) subframe of a PDSCH bundle interval including a second plurality of subframes to transmit a PUCCH during a bundle interval including a third plurality of subframes.

In the above description, although it is assumed that the bundle interval includes a plurality of subframes, the present invention may also be applied to the case in which the bundle interval is configured with one subframe (e.g., when a repetition number of times is 1) in the same manner.

In addition, in a coverage-limited situation, a similar principle may also be applied to the case in which repetition is applied to PUSCH transmission and (UL grant) PDCCH transmission for scheduling the PUSCH transmission. PDCCH_start_SF and SF timing (hereinafter, referred to as PUSCH_start_SF) at which PUSCH bundle transmission can be started may be preconfigured. When reception/detection of a PDCCH bundle that begins to be transmitted in a specific PDCCH_start_SF is successful, transmission of PUSCH bundle corresponding to the reception/detection (or scheduled according to the reception/detection) may be started in a next closest PUSCH_start_SF in addition to a last (or initial) SF (or SF timing obtained by adding a specific offset to the SF) included in the corresponding PDCCH bundle. For example, transmission of the PUSCH bundle may be started in a next closest PUSCH_start_SF after a last subframe of the corresponding PDCCH bundle, a subframe obtained by adding a specific subframe offset to a last subframe of the PDCCH bundle, an initial subframe of the corresponding PDCCH bundle, or a subframe obtained by adding a specific subframe offset to an initial subframe of the corresponding PDCCH bundle.

FIG. 14 is a flowchart illustrating a method for receiving a PDCCH and receiving a PUSCH according to the present invention.

Referring to FIG. 14, the method for receiving a PDCCH and receiving a PUSCH may be changed according to a UE type. When a UE is a first type UE (or normal UE), the UE may detect the PDCCH signal and acquire UL grant from the detected PDCCH signal in the step S1404. In the step S1406, the UE may transmit the PUSCH in a subframe obtained by adding a specific offset to a subframe in which the PDCCH signal is detected using UL grant included in the PDCCH signal (e.g., refer to the description associated with FIG. 9). For example, the specific offset may be 4 in an FDD system and may be determined according to Table 4 above in a TDD system.

On the other hand, when a UE is a second type UE (or LCT UE), the UE may receive information about a subframe (e.g., PDCCH_start_SF) in which PDCCH repeated transmission can be started and a subframe (e.g., PUSCH_start_SF) in which PUSCH repeated transmission can be started through a higher layer (e.g., RRC layer) in the step S1402. For example, the information about the subframe (e.g., PDCCH_start_SF) in which PDCCH repeated transmission can be started and the subframe (e.g., PUSCH_start_SF) in which PUSCH repeated transmission can be started may be received through system information (e.g., second type real-SIB). In the step S1404, the UE may repeatedly receive a PDCCH during a PDCCH bundle interval including a first plurality of subframes from a subframe (e.g., PDCCH_start_SF) in which PDCCH repeated transmission can be started to successfully detect the PDCCH. In the step S1406, the UE may begin to perform repeated transmission of a PUSCH in a subframe (e.g., PUSCH_start_SF) in which PUSCH repeated transmission can be started and which is closest to a last (or initial) subframe of a PDCCH bundle interval including a first plurality of subframes to transmit a PUSCH during a PUSCH bundle interval including a second plurality of subframes. As another example, in the step S1404, the UE may begin to perform repeated transmission of a PUSCH from a subframe (e.g., PUSCH_start_SF) in which PUSCH repeated transmission can be started and which is closest to a subframe obtained by adding a specific offset to a last (or initial) subframe of a PDCCH bundle interval including a first plurality of subframes to transmit a PUSCH during a bundle interval including a second plurality of subframes.

In the example of FIG. 14, it is assumed that the bundle interval includes a plurality of subframes, but the present invention may also be applied to the case in which the bundle interval is configured using one subframe (e.g., when a repetition number of times is 1) in the same manner.

A similar principle to the above description may also be applied to PHICH transmission corresponding to PUSCH bundle transmission. An SF timing (hereinafter, referred to as a PHICH_start_SF) at which PHICH (and UL grant PDCCH) bundle transmission can be started may be pre-configured. Transmission of a PHICH (and UL grant PDCCH for retransmission scheduling) bundle corresponding to PUSCH bundle transmission may begin in a next closest PHICH_start_SF in or after a last (or initial) SF (or SF timing obtained by adding a specific SF offset to the SF) included in the corresponding PUSCH bundle. For example, transmission of a PHICH (and UL grant PDCCH for retransmission scheduling) bundle may begin in a closest PHICH_start_SF after a last subframe of the corresponding PUSCH bundle, a subframe obtained by adding a specific subframe offset to the last subframe of the PUSCH bundle, an initial subframe of the corresponding PUSCH bundle, or a subframe obtained by adding a specific subframe offset to the initial subframe of the corresponding PUSCH bundle.

For example, in the case of PHICH transmission and reception, a PHICH transmission and reception method may be changed according to a type of a PUSCH transmitting UE. When the UE is a first type UE (or normal UE), the UE may receive a PHICH signal in a subframe obtained by adding a specific offset to a subframe in which a PUSCH signal is transmitted (e.g., refer to the description associated with FIG. 10). For example, the specific offset may be 4 in an FDD system and may be determined according to Table 6 above in a TDD system.

On the other hand, when the UE is a second type UE (or LCT UE), the UE may receive information about a subframe (e.g., PHICH_start_SF) in which PHICH repeated transmission can be started through a higher layer (e.g., RRC layer). For example, information about the subframe (e.g., PHICH_start_SF) in which PHICH repeated transmission can be started may be received through system information (e.g., second type real-SIB), and information about a subframe (e.g., PDCCH_start_SF) in which PDCCH repeated transmission can be started and information about a subframe (e.g., PUSCH_start_SF) in which PUSCH repeated transmission can be started may be received through the same SIB or different SIBs. The UE may perform repeated transmission of a PUSCH during a PUSCH bundle interval including a second plurality of subframes from a subframe (e.g., PUSCH_start_SF) in which PUSCH repeated transmission can be started and then may begin to repeatedly receive a PHICH from a subframe (e.g., PHICH_start_SF) in which PHICH repeated transmission can be started and which is closest to a last (or initial) subframe of a PUSCH bundle interval including a second plurality of subframes to receive a PHICH during a PHICH bundle interval including a third plurality of subframes. As another example, the UE may begin to repeatedly receive a PHICH from a subframe (e.g., PHICH_start_SF) in which PHICH repeated transmission can be started and which is closest to a subframe obtained by adding a specific offset to a last (or initial) subframe of a PUSCH bundle interval including a second plurality of subframes to receive a PHICH during a bundle interval including a third plurality of subframes.

In the above description, although it is assumed that the bundle interval includes a plurality of subframes, the present invention may also be applied to the case in which the bundle interval is configured with one subframe (e.g., when a repetition number of times is 1) in the same manner.

Signal Configuration of PDCCH Repetition

PDCCH repetition related information configured through the proposed method (or other methods) according to the present invention may be configured using the following method (including the above proposed information items). The PDCCH repetition related information according to the present invention may be independently configured for each of CSS and USS or one PDCCH repetition related information item may be commonly configured for both the CSS and the USS. For example, with regard to an EPDCCH, PDCCH repetition related information according to the present invention may be independently configured for each EPDCCH set or one PDCCH repetition related information item may be commonly configured for all EPDCCH sets. This example may be useful to the case in which a plurality of EPDCCH-PRB sets are allocated. The EPDCCH-PRB set may be simply referred to as an EDCCH. In addition, for convenience, a CCE aggregation level and a PDCCH candidate may be referred to as "AL" and "PC", respectively.

1) Alt 1: PDCCH repetition number of times corresponding to each AL and/or PDCCH bundle start subframe (SF) (and/or used PDCCH candidate (PC) (and/or CCE) index information) may be independently configured for a plurality of CCE aggregation levels (ALs).

2) Alt 2: PDCCH repetition number of times corresponding to each AL (and/or used PDCCH candidate (PC) (and/or CCE) index information) may be independently configured for a plurality of CCE aggregation levels (ALs), and an SF in which one PDCCH bundle is started is commonly configured for all ALs.

In addition, in consideration of subframe (SF) resource overhead used for PDCCH repeated transmission and repetition size adaptation according to the overhead, a plurality of different PDCCH repetition numbers (and/or SF in which a PDCCH bundle corresponding to each case is started and/or PC (and/or CCE) index information used in respective cases) may be configured with respect to one AL.

In the case of an EPDCCH, a signal for configuring one EPDCCH bundle (repeated transmission) may be configured using one of the following methods.

1) A plurality of SFs included in one repetition may be configured with only specific PDCCH candidate (PC) (and/or CCE) resources belonging to the same EPDCCH set. For example, the EPDCCH bundle may be configured with only PC (and/or CCE) resources having the same CCE aggregation level (AL) and the same PC (and/or CCE) index while belonging to the same EPDCCH set.

2) A plurality of SFs for configuring one repetition may be configured with specific PC (and/or CCE) resources, and an EPDCCH set to which the corresponding PC (and/or CCE) resources belong may be changed for respective SFs or SF groups. For example, the EPDCCH bundle may be configured with PC (and/or CCE) resources having the same AL and the same PC (and/or CCE) index, and for example, a PC (and/or CCE) resource transmitted in the odd-number order within one repetition may belong to a specific EPDCCH set, and a PC (and/or CCE) resource transmitted in the even-number order may belong to a different EPDCCH set from the corresponding specific EPDCCH set.

3) When repetition is applied to EPDCCH transmission, a restriction is applied such that one EPDCCH set is always allocated.

In addition, in the case of an EPDCCH, the number of available resource elements (REs) belonging to the same EPDCCH set may be differently ensured for respective SFs (according to change in SF structure). Accordingly, CCE aggregation level (AL) sets allocated to the same EPDCCH set may also be changed for respective SFs. In consideration of this, when signals (e.g., PC (and/or CCE) resource) for configuring one EPDCCH repetition are configured to have the same AL, an EPDCCH bundle may be configured using one of the following methods.

1) An EPDCCH bundle corresponding to a specific AL may be configured with only SFs to which corresponding specific ALs are allocated among SFs configured to monitor an EPDCCH.

2) A restriction is applied such that EPDCCH repetition may be configured to be applied only to an AL allocated to all SFs configured to monitor an EPDCCH.

As another method, when EPDCCH repetition is applied to a specific AL, an EPDCCH bundle signal corresponding to the EPDCCH repetition may be configured with an EPDCCH signal (e.g., PC (and/or CCE) resource) having a corresponding specific AL in an SF to which the corresponding specific AL is allocated (while using all SFs set to monitor an EPDCCH) and may be configured with an EPDCCH signal having a minimum AL higher than the corresponding specific AL (or maximum AL lower than the corresponding specific AL) in an SF to which the corresponding specific AL is not allocated.

Thus far, the description has been given in terms of the case in which repeated transmission and reception are performed for coverage enhancement of a second type UE, but it may be understood that the principle according to the present invention is not restrictedly applied only to the repeated transmission and reception. In particular, the present invention may also be applied to the case in which repeated transmission and reception are not performed in the same/similar way.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Figure 15:
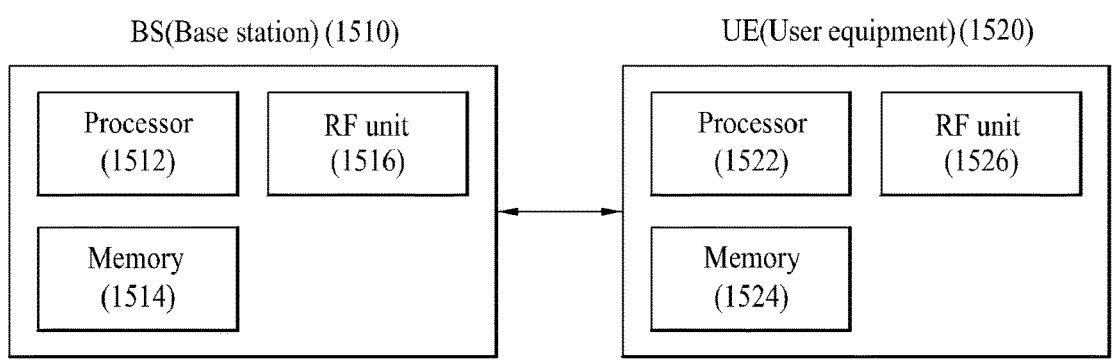
FIG. 15 illustrates a BS and a UE to which the present invention is applicable.

FIG. 15 is a diagram illustrating a BS and a UE to which the present invention is applicable.

Referring to FIG. 15, a wireless communication system includes the BS 1510 and the UE 1520. When the wireless communication system includes a relay, the BS 1510 or the UE 1520 may be replaced with the relay.

The BS 1510 includes a processor 1512, a memory 1514, and a radio frequency (RF) unit 1516. The processor 1512 may be configured to embody the procedures and/or methods proposed by the present invention. The memory 1514 is connected to the processor 1512 and stores various pieces of information associated with an operation of the processor 1512. The RF unit 1516 is connected to the processor 1512 and transmits/receives a radio signal. The UE 1520 includes a process 1522, a memory 1524, and an RF unit 1526. The processor 1522 may be configured to embody the procedures and/or methods proposed by the present invention. The memory 1524 is connected to the processor 1522 and stores various pieces of information associated with an operation of the processor 1522. The RF unit 1526 is connected to the processor 1522 and transmits/receives a radio signal.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present invention may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

The present invention is applicable to a wireless communication apparatus such as a user equipment (UE), a base station (BS), etc.

What is claimed is:

1. A method for receiving system information by a user equipment (UE) in a wireless communication system supporting coverage enhancement, the method comprising:
   receiving, by the UE, a first system information block (SIB) from a base station, the first SIB including scheduling information indicating resource block information and transport block size information for a second SIB; and
   repeatedly receiving, by the UE, the second SIB from the base station based on the indicated resource block information and transport block size information.

2. The method according to claim 1, wherein the second SIB is received through a physical downlink shared channel (PDSCH).

3. The method according to claim 2, wherein a physical downlink control channel (PDCCH) corresponding to the PDSCH is not used for receiving the second SIB.

4. The method according to claim 1, wherein a number of repetitions for the second SIB is indicated through the first SIB.

5. The method according to claim 1, wherein the first SIB is received through a PDSCH.

6. The method according to claim 1, wherein a PDCCH is used for a PDSCH carrying a signal other than the first SIB and the second SIB.

7. The method according to claim 6, wherein the PDCCH is repeated in consecutive subframes, and a number of repetitions and a start subframe of the consecutive subframes are determined based on a radio resource control (RRC) layer signal.

8. The method according to claim 6, wherein the PDSCH carrying the signal other than the first SIB and the second SIB is repeated in consecutive subframes other than subframes receiving the first SIB and the second SIB.

9. The method according to claim 8, wherein a number of repetitions and a start subframe of the consecutive subframes are determined based on a RRC layer signal.

10. A user equipment (UE) receiving system information in a wireless communication system supporting coverage enhancement, the UE comprising:
    a radio frequency (RF) unit; and
    a processor operatively connected to the RF unit and configured to:
        receive a first system information block (SIB) from a base station through the RF unit, the first SIB including scheduling information indicating resource block information and transport block size information for a second SIB, and
        repeatedly receive the second SIB through the RF unit from the base station based on the indicated resource block information and transport block size information.

11. The UE according to claim 10, wherein the second SIB is received through a physical downlink shared channel (PDSCH).

12. The UE according to claim 11, wherein a physical downlink control channel (PDCCH) corresponding to the PDSCH is not used for receiving the second SIB.

13. The UE according to claim 10, wherein a number of repetitions for the second SIB is indicated through the first SIB.

14. The UE according to claim 10, wherein the first SIB is received through a PDSCH.

15. The UE according to claim 10, wherein a PDCCH is used for a PDSCH carrying a signal other than the first SIB and the second SIB.

16. The UE according to claim 15, wherein the PDCCH is repeated in consecutive subframes, and
    wherein a number of repetitions and a start subframe of the consecutive subframes are determined based on a radio resource control (RRC) layer signal.

17. The UE according to claim 15, wherein the PDSCH carrying the signal other than the first SIB and the second SIB is repeated in consecutive subframes other than subframes receiving the first SIB and the second SIB.

18. The UE according to claim 17, wherein a number of repetitions and a start subframe of the consecutive subframes are determined based on a RRC layer signal.

* * * * *